United States Patent
Kumar et al.

(10) Patent No.: US 7,132,764 B2
(45) Date of Patent: *Nov. 7, 2006

(54) INNOVATIVE REGULATION CHARACTERISTICS IN MULTIPLE SUPPLY VOLTAGES

(75) Inventors: Pavan M Kumar, Portland, OR (US); Lilly Huang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 349 days.

This patent is subject to a terminal disclaimer.

(21) Appl. No.: 10/787,281

(22) Filed: Feb. 26, 2004

(65) Prior Publication Data

US 2004/0165328 A1  Aug. 26, 2004

Related U.S. Application Data

(63) Continuation of application No. 10/053,685, filed on Jan. 24, 2002, now Pat. No. 6,747,855.

(51) Int. Cl.
*H02J 1/10* (2006.01)

(52) U.S. Cl. .................................. 307/43
(58) Field of Classification Search ............ 307/43
See application file for complete search history.

(56) References Cited

U.S. PATENT DOCUMENTS

| | | | |
|---|---|---|---|
| 5,734,259 A | 3/1998 | Sisson et al. | 323/282 |
| 6,009,000 A | 12/1999 | Siri | 363/21.09 |
| 6,130,526 A | 10/2000 | Yang et al. | 323/272 |
| 6,160,386 A | 12/2000 | Hemena et al. | 323/272 |
| 6,177,783 B1 | 1/2001 | Donohue | 323/272 |
| 6,181,120 B1 | 1/2001 | Hawkes et al. | 323/282 |
| 6,437,548 B1 | 8/2002 | Aas et al. | 323/272 |
| 2001/0045815 A1 | 11/2001 | Muratov et al. | |

FOREIGN PATENT DOCUMENTS

WO  0073970 A1  12/2000

OTHER PUBLICATIONS

"Generalized Synthesis and Applications of Zero-Impedance Converter and its Dual," Novica A. Losic, et. al., IEEE Transactions on Circuits and Systems 1:Fundamental Theory and Applications, IEEE Inc., New York, U.S. vol. 46, No. 11, Nov. 1999, pp. 1349-1359, XP000931899, ISSN: 1057-7122.

*Primary Examiner*—Robert L. Deberadinis
(74) *Attorney, Agent, or Firm*—Pillsbury Winthrop Shaw Pittman LLP (57) ABSTRACT

An apparatus and method for regulating multiple input voltages for a microelectronics device. The apparatus includes a controller configured to maintain each of the multiple input voltages supplied to one or more microelectronics devices within a range. The controller may be further configured to maintain input voltage according to a lower limit providing a wider regulation window for the power supply to operate without sacrificing performance for the microelectronics device or degrading its reliability. In one embodiment, the controller is configured to statically or dynamically adjust a gain factor for of a feedback loop in order to maintain the device input voltage according to a regulating loadline.

20 Claims, 8 Drawing Sheets

Fig. 1

PRIOR ART

INNOVATIVE REGULATION CHARACTERISTICS IN MULTIPLE SUPPLY VOLTAGES

RELATED APPLICATIONS

This is a continuation of application Ser. No. 10/053,685, filed Jan. 24, 2002, now U.S. Pat. No. 6,747,855.

BACKGROUND OF THE INVENTION

1. Field of the Invention

The present invention relates generally to the field of power supply regulators, and, more specifically, to power supply regulators for microelectronic equipment.

2. General Background and Related Art

As the speed and performance of microelectronics devices have continued to increase, so too have the input power requirements for these microelectronics devices continued to increase. Such microelectronics devices include, for example, a microprocessor device utilizing a processor die embodied in an integrated circuit. However, it is desirable to reduce input power requirements from an engineering perspective in order to limit power consumption and to permit relatively smaller form factors still capable of providing the required heat dissipation. Therefore, techniques have been developed for reducing input power requirements while maintaining and increasing processing performance and speed.

For microprocessor devices, for example, reduction in the Central Processing Unit (CPU) supply voltage has been a widely employed technique used to achieve a reduction in power consumption. Another technique includes providing microelectronics devices designed to operate using multiple supply voltages in order to reduce the overall total power consumption of the device. One such technique in particular involves providing a microelectronics device (for example, a single processor die) designed for operation with either of two different input voltage ranges.

The amount of permissible deviation in the input supply voltage is a critical parameter in the design of microelectronics devices. The choice of design techniques and circuit configurations to be used in realizing the design of the microelectronics device may be limited due to a particular input supply voltage tolerance specification. Furthermore, if the input power (voltage or current) is not maintained within its required tolerances (also known as "out of regulation"), the behavioral characteristics of the microelectronics device's circuitry may be adversely affected to cause a variety of unwanted behaviors, including device latchup or transitions into indeterminate states. For at least these reasons, it is desirable to maintain input power voltage and current within specified tolerances. Toward this end, power supply regulators are used to maintain input power received from a power source such as, for example, a battery or a loosely regulated source, within the required design tolerances.

The amount of permissible deviation in input voltage in particular may be expressed as a percentage tolerance centered at a particular voltage level. For example, an input voltage specification may require an input voltage $V_{CC}$ to be +2 $V_{DC} \pm 10\%$. In other words, the input voltage must be maintained by a regulator to within 10% of +2 $V_{DC}$ in order to be considered within regulation.

Microelectronics devices designed to utilize two or more input voltage specifications may present particularly challenging design issues. One such challenge is that the actual amount of permissible deviation in the input voltage may become smaller, or tighter, as the required input voltage level is reduced. Thus for the lower of the two (or more) input voltage levels, the permissible deviation of the input voltage can be significantly tighter than for the larger input voltage level(s), even as microcircuit devices demand increasing amounts of input current, $I_{CC}$, at the lower $V_{CC}$.

Figure 1:
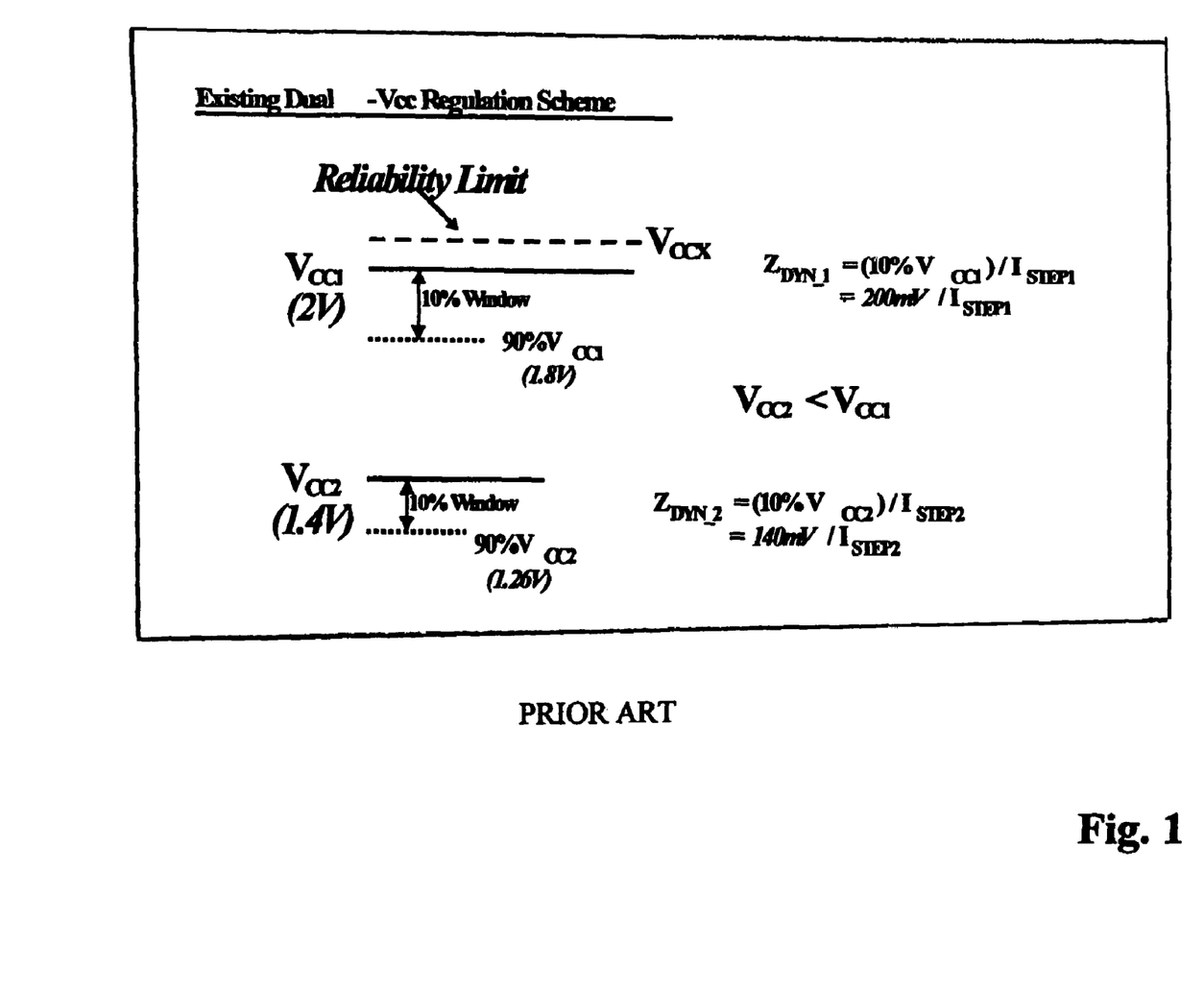
FIG. 1 is an exemplary illustration of the relatively tighter voltage tolerance required to be maintained for the lower of two input voltage requirements according to prior regulators.

FIG. 1 is an exemplary illustration of the relatively tighter tolerance required to be maintained "in regulation" for the lower of two input voltage requirements. Referring to FIG. 1, in order to provide regulated input power for a given microelectronics device at a nominal voltage of $V_{CC}$, under any load conditions the input voltage is required to be within a tolerance of, for example, a 10% $V_{CC}$ window, or $V_{CCmin} \geq 90\% * V_{CC}$. Such a scheme is typically employed to limit the excursion of the supply voltage to a small window. As for an upper limit, device reliability may be reduced if the supply voltage presented to the microelectronics device rises above $V_{CCx}$, a reliability limit voltage level greater than $V_{CC}$ nominal. The 10% window required for voltage regulation places a heavy burden on the power supply and power delivery system to meet a tight dynamic impedance range ($Z_{DYN\_1}$) for a given current step, as impedance reduces linearly as the supply voltage decreases or load current increases.

The exemplary voltage values depicted in FIG. 1 are shown in an example for a dual $V_{CC}$ system. As shown in FIG. 1, in the case of the higher supply voltage ($V_{CC}$=2.0 $V_{DC}$) the regulation window available, or range, is about 200 mV whereas the regulation window decreases to 140 mV at the lower input voltage level of 1.4 $V_{DC}$. As the microelectronics device supply voltage drops to the sub ~1 Volt range, the regulation window increasingly becomes a critical design issue. In particular, the stringent tolerance requirement on the lower input voltage may be the cause of design difficulties and significantly increased product cost due to design constraints for avoiding electrical phenomena such as droops using decoupling effects, and also due to the increased circuitry required to regulate the input voltage to within such fine tolerances. In the environment of multiple input voltage required values, this problem may be exacerbated by, for example, static and transient voltage "droop" characteristics occurring for the lower $V_{CC}$ input voltage required value when the microelectronics device demands relatively high supply current. Voltage droop describes a situation in which the input voltage provided by the regulator to the microelectronics device moves toward or is presented at a voltage level that is lower than the specified input voltage required value but is still within the specified tolerance level to maintain supply voltage in regulation.

BRIEF DESCRIPTION OF THE DRAWINGS

Utility of the embodiments of the present invention will be readily appreciated and understood from consideration of the following detailed description of the embodiments.

DETAILED DESCRIPTION

In some embodiments the present invention may include a system and method for a power regulator that supplies regulated power to one or more microelectronics devices, such as a microprocessor, at lower cost in terms of power consumption without sacrificing performance, speed, or reliability in the microelectronics device. In particular, in at least one embodiment there is provided a system and method for a voltage regulation scheme addressing the static and transient droop characteristics on lower Vcc input voltages supplied under the environment of multiple device or CPU voltage levels.

Figure 2:
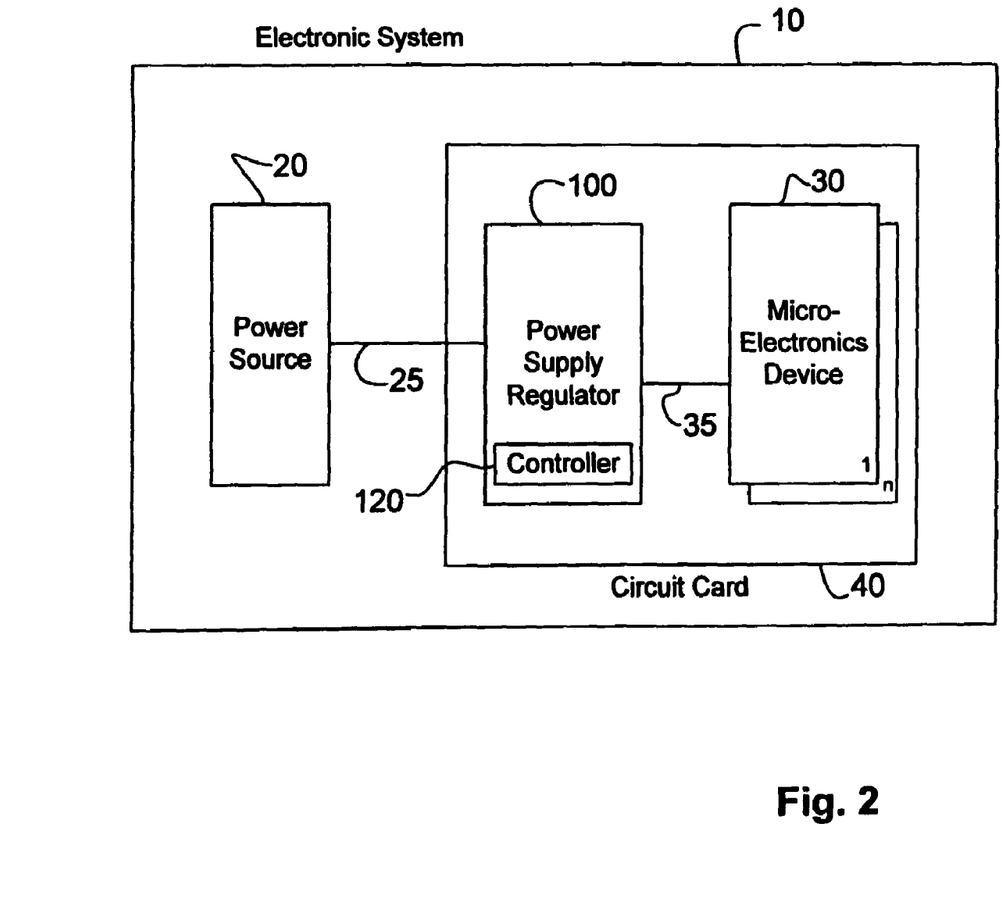
FIG. 2 is a schematic block diagram of an embodiment of an electronic system according to the present invention.

FIG. 2 provides an overall block diagram description of an embodiment of the present invention. The term "an embodiment" as used herein is understood to mean "at least one embodiment." Further, the term "may" as used herein is understood to mean "could, but not necessarily must." Referring to FIG. 2, an electronic system 10 may include a power source 20, one or more microelectronics devices 30, and a power supply regulator 100. Power supply regulator 100 may be coupled to power source 20 via a power source interface 25 and to microelectronics device 30 via one or more input power interfaces 35. Regulator 100 may include a controller 120 configured to cause regulator 100 to produce regulated input voltages as described herein. In an embodiment, power source 20 may be a source of rectified direct current (DC) voltage such as, but not limited to, a battery or an output of an AC power transformer/adapter. Regulator 100 may receive source voltage from power source 20 via power source interface 25. Further, regulator 100 may provide regulated input voltages to one or more microelectronics devices 30 via input power interface 35.

Microelectronics device 30 may be any electronic device having an integrated circuit component. In an embodiment, microelectronics device 30 may consist of electronic circuitry in the form of a processor die embodied in an integrated circuit package. Microelectronics device 30 may be designed to require more than one input voltage for operation in accordance with multiple modes. For example, microelectronics device 30 may require a higher input voltage of, for example, $V_{CC1}=2.0\ V_{DC}$, as a principal supply voltage for normal operation and may also require a lower input voltage of, for example, $V_{CC2}=1.4\ V_{DC}$ as a secondary supply voltage for normal operation or an idle mode or reduced functionality operating mode.

Electronic system 10 may be, for example, a desktop computer, a laptop computer, a notebook computer, a wireless telecommunications terminal, a personal communications services terminal, a card reader, a transmitter and/or receiver, or any other such electronic system. Power source 20, microelectronics device 30, and regulator 100 may be positioned interior to a housing of electronic system 10. Alternatively, power source 20 may be located exterior to the housing of electronic system 10. Power source interface 25 coupling power source 20 to regulator 100 may consist of two or more conductive elements such as metal filament wires. In an embodiment, regulator 100 and microelectronics device 30 may be mounted on a circuit card substrate 40 which may also be located interior to the housing of electronic system 10. In this embodiment, input power interface 35 may be provided in the form of one or more circuit traces of circuit card substrate 40 providing electrical connectivity between regulator 100 and microelectronics device 30.

Figure 3:
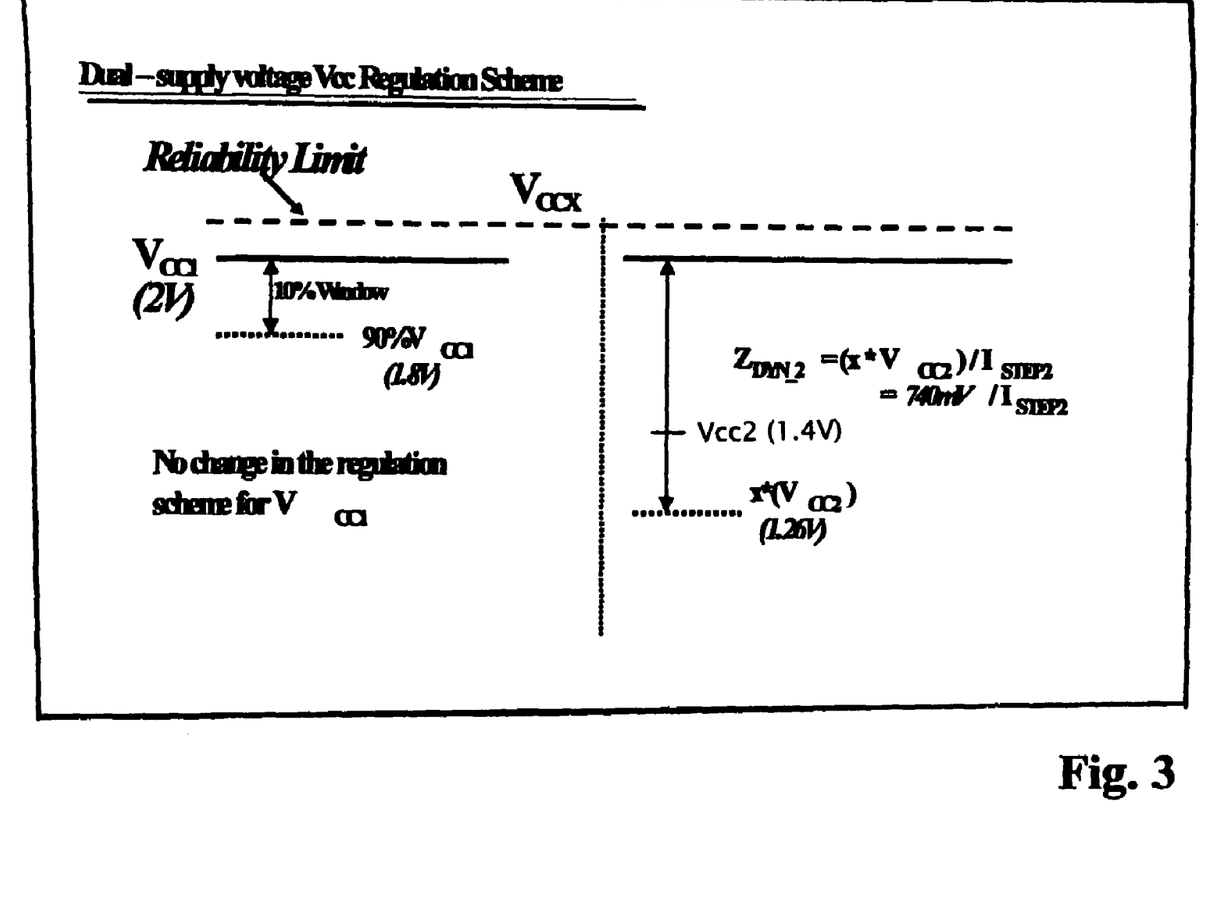
FIG. 3 illustrates a regulation scheme in accordance with an embodiment of the present invention.

FIG. 3 illustrates a regulation scheme in accordance with an embodiment of the present invention. Referring to FIG. 3, a principal supply voltage is still operated within a 10% tolerance window or level with an upper limit bounded by reliability voltage value $V_{ccx}$ as was the case for FIG. 1. However, for the present embodiment the secondary supply voltage is operated within a range having an upper limit that is the same as for the principal supply voltage, i.e., $V_{ccx}$. The principal supply voltage is operated within a range having a lower limit of the 0.90 multiplied by a first input voltage required value (Vcc1), i.e., 0.90×Vcc1 or one minus the tolerance level 10%, multiplied by the first input voltage required value. The secondary supply voltage, Vcc2, is operated within a range having a lower limit of 0.90 multiplied by a second input voltage required value (Vcc2), i.e., 0.90×Vcc2, or one minus the tolerance level (10%) multiplied by the second input voltage required value. For example, if Vcc2 is 1.4 volts, the lower limit of the range that the secondary supply voltage Vcc2 is operated within would be 1.26, or (0.9×1.4).

The lower limit may also be determined based upon the change in dynamic impedance, $Z_{DYN\_2}$, occurring for a given step change in load current, $I_{STEP\_2}$ according to Equation 1:

$$Z_{DYN\_2}=(x*V_{CC2})/I_{STEP\_2} \qquad \text{(Equation 1)}$$

where $(0.1 \leq x \leq 1)$ $V_{CC2} \leq V_{CC1}$

A regulating scheme in accordance with an embodiment of the present invention is further described using an exemplary numerical example in reference to FIG. 3. Referring to FIG. 3, the second input voltage required value, Vcc2, where Vcc2<Vcc1, ma be for example, 1.4 VDC and the first input voltage required value, Vcc1, may be, for example, 2.0 VDC. As shown in FIG. 2, for each different input voltage required value, the regulator provided in accordance with an embodiment may maintain each of the distinct input voltages presented to the microelectronics device 30 within the same upper limit, Vccx, which is the same upper limit for Vcc1. However, the regulator provided in accordance with the embodiment may maintain the lower limit for the second input voltage required value, Vcc2 (1.4 VDC, for example), equal to the lesser of the product of one minus the tolerance level (in this example 10%) multiplied by the first input voltage required value (2.0 VDC) and one minus the tolerance level multiplied by the second input voltage required value (1.4 VDC). In the exemplary regulating scheme of FIG. 3, this determination yields a lower limit of 1.26 VDC, thus giving the power in accordance with an embodiment a dynamic window from the second input voltage required value, of 740 mV instead of the relatively tight range of 140 mV.

A regulation scheme of an embodiment, as shown in FIG. 3, therefore may provide a looser (i.e., larger) regulation window or range required to be provided by the regulated power supply 100 without sacrificing the performance of the microelectronics device 30. Furthermore, the reliability of microelectronics device 30 (such as, for example, a processor) may not be compromised under the scheme according to an embodiment because the upper limit, Vccx, the reliability limit, is not breached. Vccx may represent a thermal design point (TDP) for microelectronics device 30, and as such may constitute a reliability limit to be maintained by regulator 100. In addition, the thermal design (TDP) advantage of utilizing multiple input voltage required values, or Vcc's, over a single input voltage required value as realized by microelectronics device 30 may still be maximized if the excursion of the lower Vcc supply is tightly controlled in response to changes in the microelectronics device 30 load current.

Figure 4:
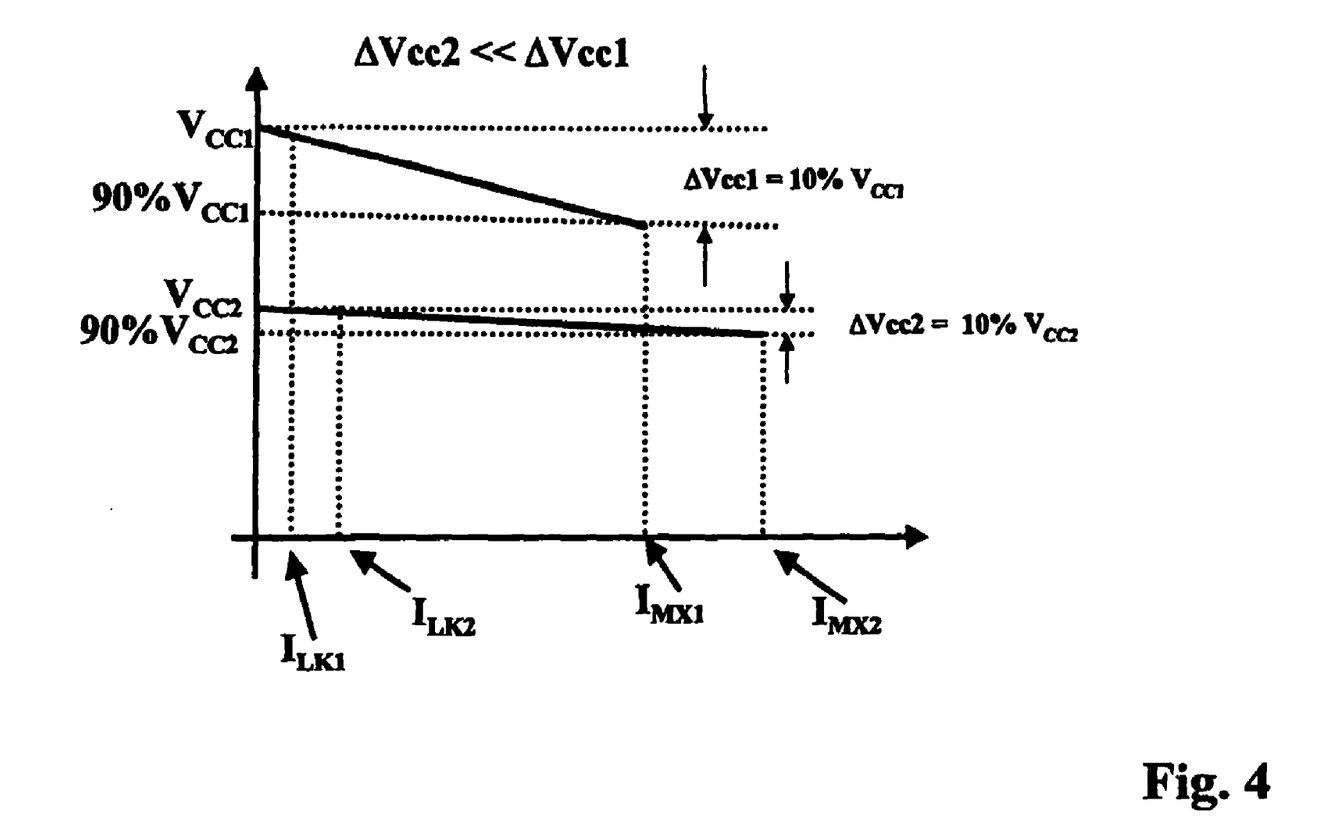
FIG. 4 is graph showing a pair of linear voltage-current loadlines for two input voltages for a voltage regulation scheme.
Figure 5:
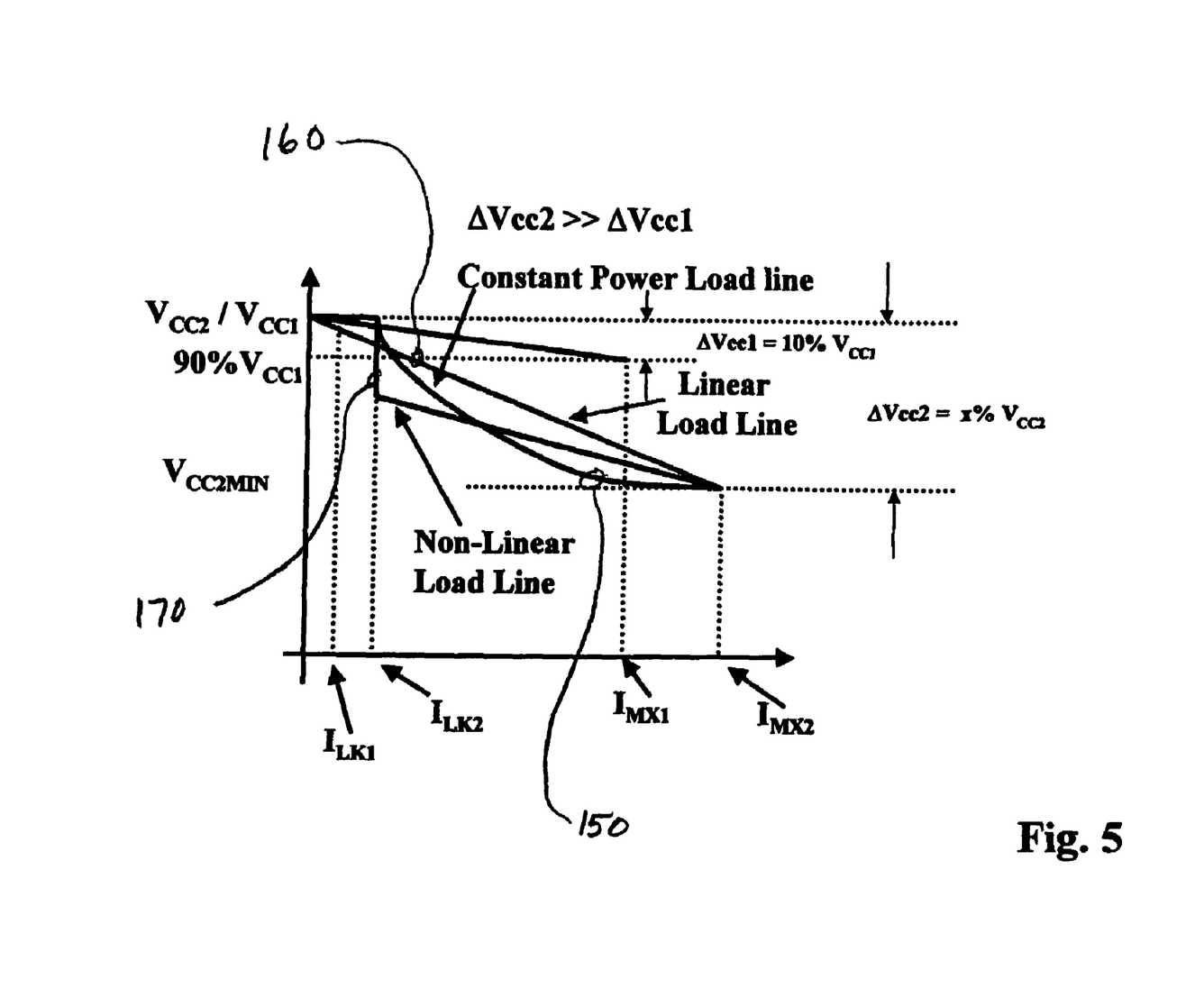
FIG. 5 is a graph showing a set of voltage-current loadlines for multiple input voltages provided by an embodiment of a regulator in accordance with the present invention.

A regulating scheme in accordance with an embodiment may also be further described in terms of supply voltage loadlines illustrated in the voltage-current curves of FIGS. 4 and 5. FIG. 4 shows a regulating scheme in which the loadline for each input voltage required value has a continuous slope from the required value to within a lower limit based on a required tolerance level of, for example, 90% of their nominal values.

FIG. 5 shows a further set of loadlines that may be provided by a regulator 100 in accordance with an embodiment. Referring to FIG. 5, the loadlines for the secondary supply voltage may be continuous or discontinuous at a particular current value such as, for example, but not limited to, a value equal to the leakage current of the microelectronics device 30. The loadline may be discontinuous for any load current between zero and the maximum load current. When microelectronics device 30 operates in a lower demand state such as, for example, a standby state, the load current may equal the device leakage current (i.e., Icc=Icc–leakage). In this exemplary case, the voltage supplied by regulator 100 such as $V_{CC2}$ may drop and move toward its lower limit, $V_{CC2MIN}$, at device leakage current, $I_{LK2}$, and may reach $V_{CC2MIN}$ at device maximum current, $I_{MX2}$. As shown in FIG. 5, only as device current demand approaches $I_{LK1}$ from $I_{LK2}$ does $V_{CC2}=V_{CC1}$. Therefore, in this example as long as regulator 100 controls the excursion of voltage-current supplied to microelectronics device 30 according to any one of the V–I curves shown in FIG. 5 in a manner that maintains I=Pmax/V, where Pmax is a constant that may be, for example, determined by the microelectronics device 30 thermal design envelope, then the thermal design advantage derived from using multiple input voltages is achieved. The regulating scheme of an embodiment of the present invention thereby provides favorable power supply design characteristics as well as supporting improved thermal design characteristics associated with microelectronics device 30. Other regulation schemes are possible without departing from the spirit and scope of the present invention.

Figure 6:
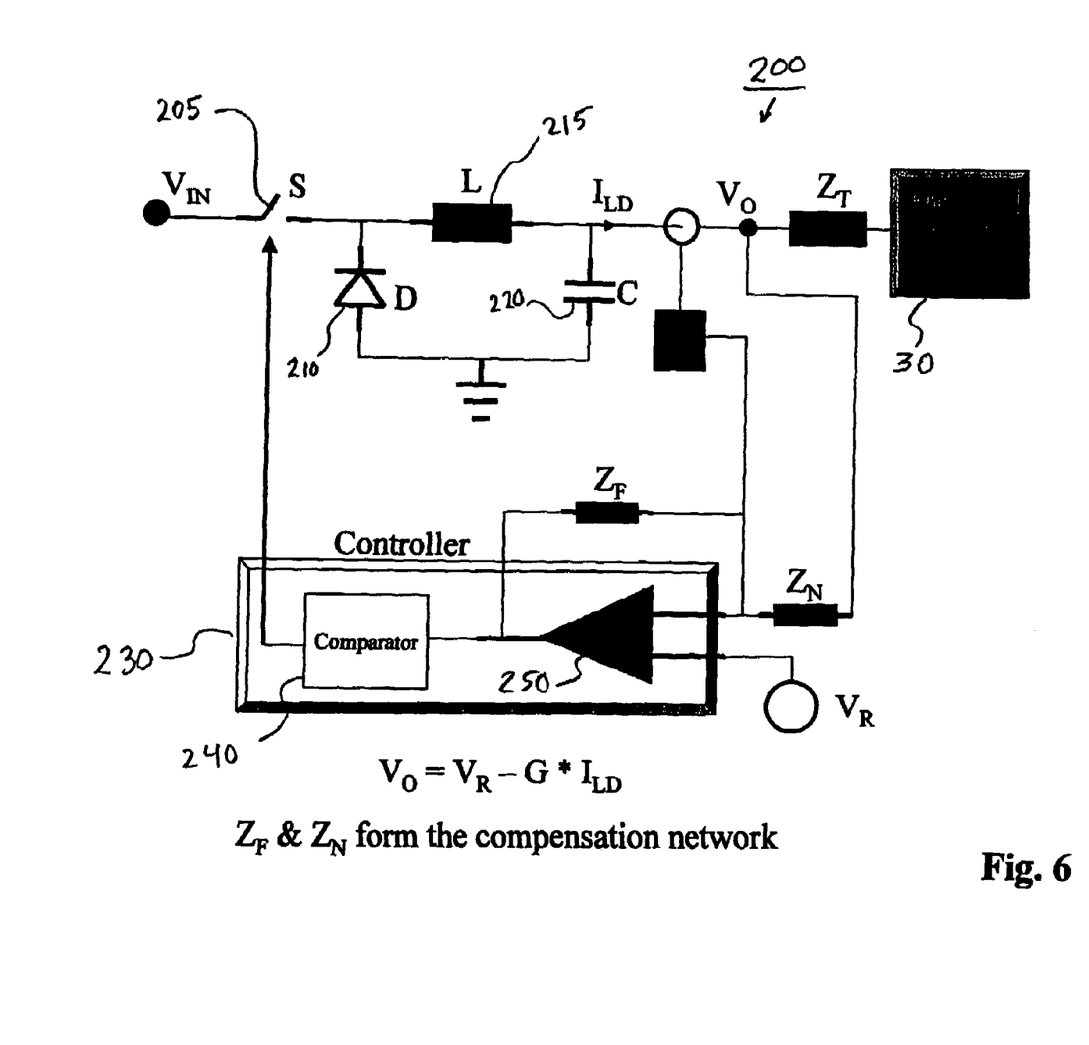
FIG. 6 is a schematic diagram of a power supply regulator for a prior regulation scheme.

As described in further detail below, an exemplary embodiment of the present invention for regulation of multiple supply voltages for microelectronics devices may use the buck converter power supply regulation topology. In a microelectronics device 30 such as, for example, a microprocessor, the power delivery scheme can be represented as shown in FIG. 6. Referring to FIG. 6, a buck converter 200 (which may be a multiphase buck converter) may include a switch (S) 205, a diode (D) 210, an inductor (L) 215, and an output filter capacitor (C) 220. Buck converter 200 may further include a controller 230 having a comparator 240 and a threshold detector 250. In FIG. 6, the value $Z_T$ represents the total interconnect impedance between the output of the voltage regulator and the microelectronics device 30.

In the buck converter 200, the regulator output voltage $V_O$ may be adjusted by a controller 230 configured to vary the duty cycle of the switch 205. Controller 230 may also sense the output current, multiply the sensed current by a current feedback gain factor (G), and provide the current feedback value to controller 230. By varying the duty cycle of switch 205, controller 230 may cause the regulator output voltage $V_O$ to conform to a voltage-current loadline as shown in FIG. 4 or 5 restricting the excursion of the output voltage to be within a range based on a particular tolerance level. For example, for a 10% tolerance level, regulator output voltage $V_O$ value may be maintained at a level that is lower than the associated input voltage required value, or reference voltage $V_R$. The tolerance level of 10% may be due to, among other things, an input voltage level for which microelectronics device performance reaches an unacceptably degraded level due to supply voltage falling more than 10% below the set value $V_R$. In the buck converter 200, the value of the current feedback gain (G) may be computed based on the value of the load current $I_{LD}$, the percentage droop value of $V_R$ (e.g., 10%), and the resistance value of the total interconnect impedance $Z_T$.

Figure 7:
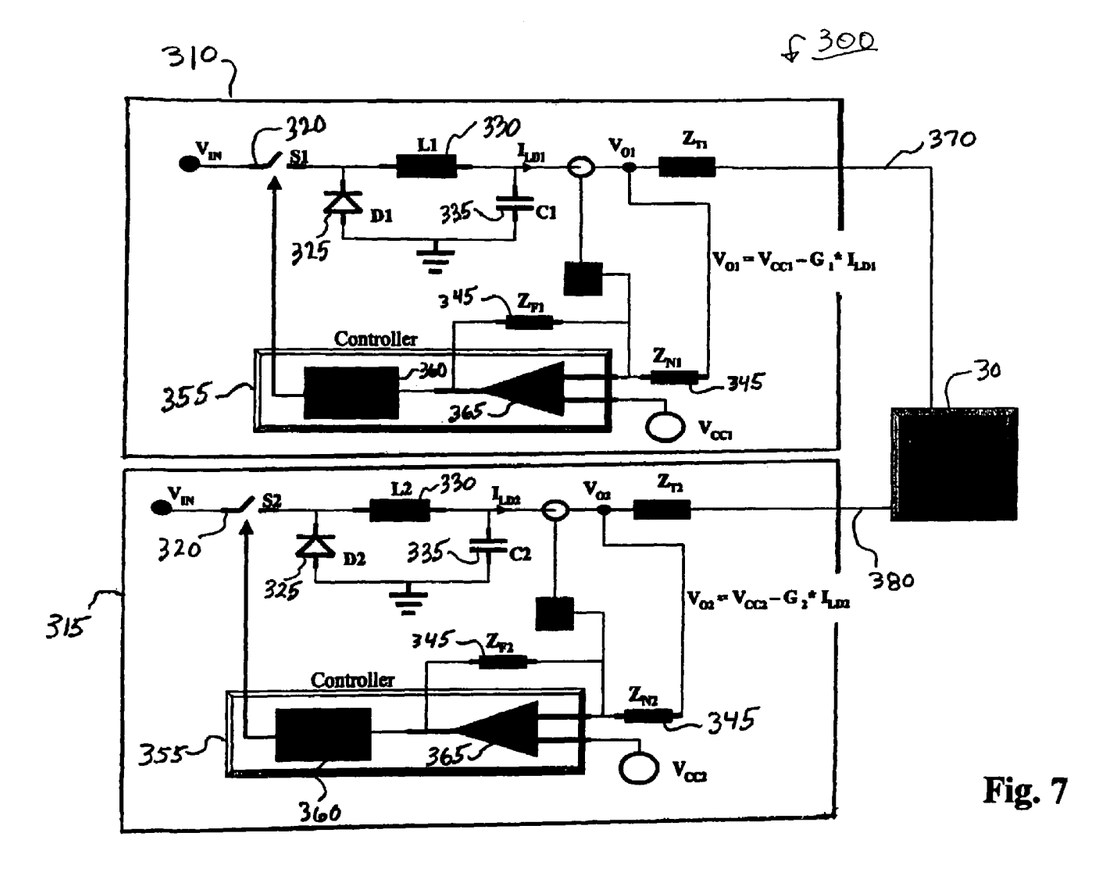
FIG. 7 is a schematic diagram of an embodiment of a regulator for a power delivery scheme in accordance with the present invention.

FIG. 7 illustrates an embodiment of a regulator circuit 300 for a power delivery scheme in accordance with an embodiment. As shown in FIG. 7, the system of an embodiment for multiple supply voltage regulation may be implemented using the buck converter topology in accordance with similar principles as those described above with respect to FIG. 6. However, an embodiment may also be implemented in accordance with a variety of power supply regulator topologies such as, but not limited to, the boost and flyback arrangements. FIG. 7 illustrates a conceptual implementation of a variable droop regulation scheme in accordance with an embodiment for a microelectronics device (such as, but not limited to, a processor) requiring dual input supply voltages. However, other embodiments of the present invention are possible; for example, an embodiment may provide regulation for multiple input voltages in excess of the exemplary two input voltage embodiment described in detail herein.

Referring now to FIG. 7, microelectronics device 30 may be, for example, designed to operate using two input voltage required values, Vcc1 and Vcc2. In this case, the regulator circuit 300 provided in accordance with an embodiment may include two conceptually distinct regulator circuits 310 and 315. As shown in FIG. 7, regulator circuit 310 may be used to provide power supply regulation for a principal supply voltage to track a first input voltage required value, Vcc1, while regulator circuit 315 may be used to provide power supply regulation for a secondary supply voltage to track a second input voltage required value, Vcc2, in accordance with an embodiment. In an embodiment, the first input voltage required value, Vcc1, may be a higher input voltage of, for example, 2.0 VDC, while the second input voltage required value, Vcc2, may be a lower input voltage of, for example, 1.4 VDC. In an exemplary embodiment of FIG. 7, regulator circuits 310 and 315 are provided in accordance with buck technology. The corresponding exemplary buck regulator embodiment shown in FIG. 7 includes the appropriate suffixes (e.g., "1" and "2") to designate a component regulating the principal supply voltage and the secondary supply voltage to track the first or second input voltage values, respectively. While shown schematically as being logically separate, the components of regulator circuits 310 and 315 may be implemented using one or more of the same components, or different components, without departing from the scope of the invention.

Referring now to FIG. 7, regulator circuits 310 and 315 may include a switch 320 (S1 and S2), a diode 325 (D1 and D2), an inductor 330 (L1 and L2), an output capacitor 335 (C1 and C2), a compensation network 345 ($Z_{N1}/Z_{F1}$ and $Z_{N2}/Z_{F2}$), and a controller 355. Controller 355 may include a comparator 360 and a threshold detector 365. Input voltage $V_{IN}$ from a power source may be connected to one side of switch 320. The other side of switch 320 may be connected to an inductor 330 and a diode 325 as shown in FIG. 7. The second terminal of diode 325 may be connected to ground. The second terminal of inductor 330 may be connected to one terminal of an output capacitor 335. The second terminal of capacitor 335 may be connected to ground.

Present at the second terminal of the inductor 330, after the connection to capacitor 335, may be the load current $I_{LD}$. Load current $I_{LD}$ may be sensed to provide a current feedback signal that may be multiplied by a gain factor (G1 or G2) and then provided to threshold detector 365. Load current $I_{LD}$ may be coupled to one or more microelectronics devices 30 by interfaces 370 and 380. Interfaces 370 and 380 coupling the load current $I_{LD}$ to the microelectronics device 30 may be characterized by an interconnect impedance, $Z_{T1}$ and $Z_{T2}$ respectively. Regulator output voltage $V_O$ may be also tapped and coupled to compensation network 345. The output of $Z_N$ may be connected to one input terminal of threshold detector 365 and also to $Z_F$ to complete compensation network 345. A second input terminal of threshold detector 365 may be coupled to a reference voltage, $V_{CC1}$ or $V_{CC2}$. The output of compensation network 345 may be coupled to the output of threshold detector 365, which may be in turn connected to the input of comparator 360. In one embodiment, comparator 360 may include an internal reference. In another embodiment, comparator 360 may include an external reference. The output of comparator 360 may be coupled to switch 320. Switch 320 operates (i.e., switches between "on" and "off" states) in accordance with a signal provided by controller 355 via comparator 360.

The operation of regulator circuits 310 and 315 will now be described with respect to FIG. 7. In operation, supply voltage $V_{IN}$ is presented to switch 320, which may be in either an open or closed state as determined by controller 355. The duty cycle of switch 320 may be used to control or regulate the input voltage provided by the regulator circuits 310 and 315 to microelectronics device 30. In particular, threshold detector 365 may produce an error signal based upon the magnitude of the difference between a reference voltage, $V_{CC1}$ or $V_{CC2}$, and the sensed actual device input voltage present at the output of the regulator circuit 310 or 315 (e.g., $V_O$). The magnitude of the error signal may be provided as a function of the sensed output voltage and the value of compensation network 345. Comparator 360 may control the duty cycle of switch 320 based upon the magnitude of the error signal generated by threshold detector 365. Generally, the device input voltage, $V_O$, produced by regulator 300 increases as the duty cycle of switch 320 increases.

The lower value reached by regulator output voltage, $V_O$, (which is also the device input voltage) may be controlled by selecting the gain factor, G, to achieve a desired $V_O$ within a particular lower limit of the permissible input voltage range for different values of the load current, $I_{LD}$. The gain factor may be determined by the impedance values selected for $Z_{T1}$ and $Z_{T2}$, for example. In particular, regulator circuits 310 and 315 may produce $V_O$ in accordance with the following equation:

$$V_O = V_{CC} - G \ast I_{LD} \quad \text{(Equation 2)}$$

where:

$V_O$ is the output voltage,
$V_{CC}$ is the source voltage,
G is the gain factor, and
$I_{LD}$ is the load current.

Therefore, the current sense gain, G1 or G2, may determine the percentage of input voltage "droop" experienced for a given load current $I_{LD1}$ or $I_{LD2}$, respectively. The values of G1 and G2 can be selected and computed for different embodiments as required. In particular, controller 355 may be configured to regulate supply voltage according to a variety of control criteria including, but not limited to, linear loadline, non-linear loadline, stepped, or constant power.

Figure 8:
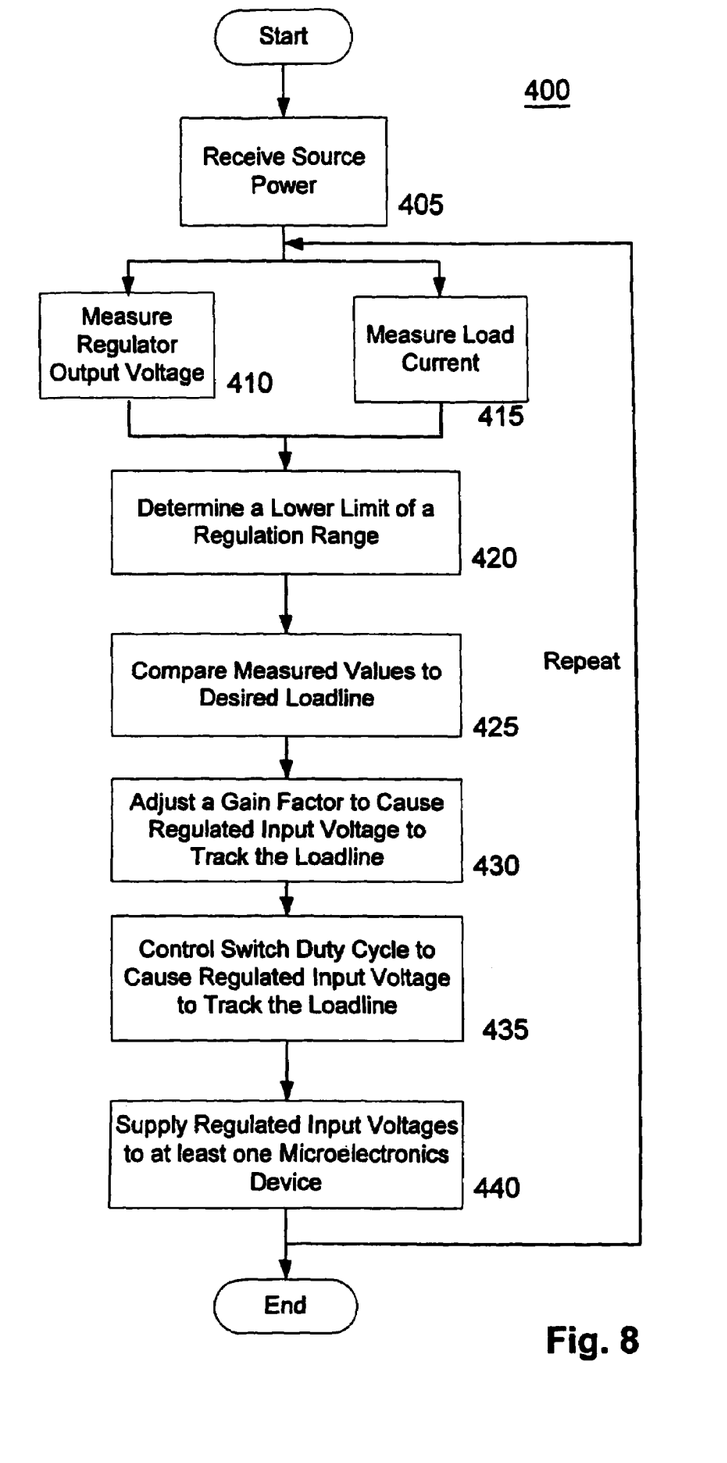
FIG. 8 is a flow chart illustrating a method for regulating device input power in accordance with an embodiment of the present invention.

A method 400 regulating device input power in accordance with an embodiment of the present invention is shown in FIG. 8. Referring to FIG. 8, regulator 100 may receive one or more supply voltages from a power source 20 at 405. Regulator 100 may measure the regulator output voltage, $V_O$, at 410 as well as the load current, $I_{LD}$, at 415. Further, regulator 100 may determine a lower limit of a regulation range for device input voltage $V_O$ in accordance with a voltage-current loadline at 420. As described elsewhere herein, the loadline may specify a linear or non-linear relationship between voltage and current. In an embodiment, the loadline is represented by a series of discrete voltage-current values stored in memory accessible by controller 355 such as, but not limited to, persistent values stored in an erasable programmable read only memory (EPROM) device. Multiple sets of loadline values may be maintained by regulator 100 corresponding to a variety of loadlines such as, but not limited to, the linear and non-linear loadlines as described herein. Controller 355 may select a particular loadline in response to a variety of events such as, for example, changes in microelectronics device power demand or input power requirements. The series of values for a given loadline may form the desired voltage-current output produced by regulator 100 for power input to one or more microelectronics devices.

The measured values from 410 and 415 may next be compared, at 425, to the associated loadline values from 420. Based on the difference between the measured values and the associated reference loadline values, controller 355 may adjust a gain factor in order to cause input voltage $V_O$ to approach the associated loadline values, at 430. In one embodiment, controller 355 may statically adjust the gain factor in response to the occurrence of a particular event such as, but not limited to, load current reaching one or more predetermined values, or at discrete intervals of elapsed time, which may or may not be periodic. In another embodiment, controller 355 may dynamically adjust the gain factor by repeatedly computing the gain factor to cause input voltage $V_O$ to closely track the loadline. Further, controller 355 may transmit a signal to a switch (reference FIG. 7) to control the duty cycle of the switch, in an exemplary switching power supply embodiment, in order to maintain device input voltage $V_O$ in accordance with the loadline values, at 435. The thus regulated device input voltage $V_O$ may then be supplied to one or more microelectronics devices at 440.

In one embodiment, controller 355 may be configured to maintain device input voltage, $V_O$, according to a linear loadline 160 as shown in FIG. 5. In this case, device input voltage may be required to be maintained above the lower limit of a percentage droop of less than 10%. By way of comparison, for regulators previous to an embodiment, the gain factor, G, could only be set such that the value of the product ($G1*I_{LD1}$) is equal to ($0.1*V_{CC1}$), and ($G2*I_{LD2}$) to ($0.1*V_{CC2}$), respectively, and as shown in FIG. 4.

For a regulator 100 according to an embodiment, however, a larger percentage voltage droop may be provided (e.g., >10% decrease in $V_{CC1}$) for the lower limit of the supply voltages. In one embodiment, for input voltage required values less than the largest of the multiple input values, the gain factor (i.e., G2) may be computed and set such that the product ($G2*I_{LD2}$) is equal to the product ($x*V_{CC2}$) where $0.1 \geq x \geq 1$ and may be based upon the design characteristics of a particular microelectronics device. This embodiment is shown as linear loadline 160 in FIG. 5.

In other embodiments of regulator 100 according to the present invention, controller 355 may be configured to maintain device input voltage, $V_O$, according to a variable or non-linear loadline 150 or 170 as shown in FIG. 5. A non-linear loadline can be implemented for any one of the multiple input voltage required values, such as the exemplary two voltages $V_{CC1}$ and $V_{CC2}$, by computing the value of the gain factor G using a concept of constant power or a stepped type of load.

For example, for an embodiment of regulator 100 in which device input voltage, $V_O$, is regulated according to a constant power loadline, the output voltage, $V_O$, of the regulator can be computed based on the principle of constant power. In accordance with this embodiment, the total power output by regulator 100 is maintained as a constant according to a voltage-current curve such as the constant power loadline 150 shown in FIG. 5. In order to maintain regulator 100 output power constant, the output voltage, $V_O$, may be repeatedly computed as $V_{CC2}=(P/I_{LD2})$ at any fixed value of $I_{LD2}$. Based on the instantaneous value of $I_{LD2}$, controller 355 may statically or dynamically change the output voltage $V_O$ based on the total power, P, rather than as a fixed percentage droop as in the linear loadline embodiment.

Furthermore, for an embodiment of regulator 100 in which device input voltage $V_O$ is regulated according to a discontinuous or stepped loadline, the output voltage $V_O$ of the regulator can be computed based on a particular instantaneous value of $I_{LD2}$. In accordance with this embodiment, regulator 100 maintains output voltage $V_O$ according to a non-linear loadline 170 such as that shown in FIG. 5. In this embodiment, the value of G may also be computed in discrete steps for instantaneous values of load current $I_{LD}$. Up to a certain intermediate value of $I_{LD}$ between zero and maximum $I_{LD}$ such as, for example, $I_{LK2}$, controller 355 may require regulator 100 to follow a 10% droop specification as shown for loadline 170. For $I_{LD}$ greater than the value of $I_{LK2}$, the droop could be more or less than 10% depending on the design tolerances of the microelectronics device. $I_{LK2}$ may correspond to a leakage current value for a given microelectronics device.

In a further embodiment, regulator 100 may make a step change in the output voltage $V_O$ at any given point, or at various points for different values of $I_{LD}$, along a particular loadline between the minimum and maximum values of the load current. Such regulation schemes may require more complex embodiments for computing the value of G. Therefore, controller 355 may be implemented using a Digital Signal Processor (DSP) to provide rapid calculation of the gain factor, in order to provide dynamic adjustment of the gain factor G in response to near instantaneous changes in load current $I_{LD}$.

Alternatively, controller 355 according to an embodiment may be implemented using a microprocessor, microcontroller, a programmable logic array, a portion of an application specific integrated circuit (ASIC), or other integrated circuit device, or using discrete components, or any combination thereof. For DSP, microprocessor and microcontroller embodiments, controller 355 may operate in accordance with a sequence of programmed instructions that are executed by the DSP, microprocessor, or microcontroller to provide power regulation as described herein. For programmable logic and ASIC embodiments, controller 355 may be configured to operate in accordance with a sequence of Hardware Descriptive Language (HDL) statements. Referring back to FIG. 2, controller 355 may be implemented on a die, which die may be shared with the microelectronics device and with some of the other components of the regulator 100 being external to the die.

Thus, a system and method for providing efficient power supply regulation for one or more microelectronics devices that require multiple input voltages has been shown. As is apparent from the description shown herein, embodiments of the present invention may be configured to support many different and variable regulation schemes for the different supply voltages as determined by a system designer.

In particular, an embodiment serves to provide a larger dynamic window for the second (or multiple lower) processor power supply voltages, thereby allowing less stringent regulation schemes that permit power delivery and decoupling to be implemented at relatively lower cost while achieving the same performance of the microelectronics device. Furthermore, the thermal characteristics of the microelectronics device are not compromised as the total power dissipation is not adversely impacted for the system according to an embodiment. The small extra thermal dissipation during light load conditions (e.g. leakage current draw) adds no considerable thermal burden on the microelectronics device because its system thermal cooling is designed for the worst case scenario.

While embodiments of the present invention have been described hereinabove, these embodiments are intended to be illustrative, and should not be construed as limitations on the scope of the invention. Many variations are possible without departing from the spirit and scope of the present invention. Accordingly, the scope of the present invention should be determined not by the embodiments illustrated above, but by the claims appended hereto and their legal equivalents.

What is claimed is:

1. A power supply system, comprising:
a controller configured to cause a regulator to produce a principle supply voltage and a secondary supply voltage, said regulator for coupling to a power source and to a microelectronics device to supply said principal supply voltage and said secondary supply voltage to said microelectronics device,
wherein said controller is further configured to maintain said principal supply voltage within a tolerance level bounded at a principal supply upper limit by a first reliability voltage value and bounded at a principal supply lower limit by a second reliability voltage value, and to maintain said secondary supply voltage within a second tolerance level bounded at a secondary supply upper limit by the first reliability voltage value and bounded at a secondary supply lower limit by a third reliability voltage value, said principal supply voltage and said secondary supply voltage determined in accordance with a gain factor by a voltage-current loadline, said first reliability voltage is determined by multiplying one plus a tolerance level by a first input voltage required value and the second tolerance level for the secondary supply voltage has a large first percentage of tolerance for the secondary supply upper limit and a significantly smaller second percentage of tolerance for the secondary supply limit.

2. The regulator of claim 1, wherein said controller is further configured to adjust said gain factor as required to produce said principal supply voltage and said secondary supply voltage according to said voltage-current loadline, wherein said loadline specifies a linear relationship for said primary supply voltage and said secondary supply voltage.

3. The regulator of claim 1, wherein said controller is further configured to adjust said gain factor as required to produce said primary supply voltage and said secondary supply voltage according to said voltage-current loadline, and wherein said voltage-current loadline specifies a total power voltage-current relationship.

4. The regulator of claim 1, wherein said controller is further configured to adjust said gain factor as required to produce said primary supply voltage and said secondary supply voltage according to said loadline, and wherein said voltage-current loadline specifies a non-linear relationship for said primary supply voltage and said secondary supply voltages.

5. The regulator of claim 4, wherein said non-linear loadline further includes a discontinuity corresponding to an intermediate current value between zero and maximum, associated with said microelectronics device.

6. A regulator, comprising:
a plurality of regulator circuits for coupling to a microelectronics device to provide a plurality of regulated input voltages to said microelectronics device, the plurality of regulated input voltages being maintained within an input voltage range bounded at an upper limit by a first reliability voltage value, the first reliability voltage value determined by multiplying a first one of the plurality of regulated input voltages by the sum of one and a tolerance level, wherein each regulator circuit provides a particular one of said plurality of regulated input voltages to said microelectronics device,
wherein each said regulator circuit further includes:
a controller including a comparator and a threshold detector, an input of said comparator being coupled to the output of said threshold detector,
a switch coupled to said controller and operating in response to a signal provided by said controller, said switch connected to an inductor, a diode, and an output capacitor arranged in a network that produces a load current in response to an input source voltage received via said switch, and
a current sense feedback network connected to said network output and having a gain factor, said feedback network coupled to said threshold detector to cause said threshold detector to produce an output signal as a product of said gain factor,
the controller being configured to produce one of said plurality of regulated input voltages by varying the duty cycle of said switch in accordance with a voltage current loadline,
and to maintain said one of said plurality of regulated input voltages within an input voltage range bounded at a lower limit, and
the lower limit for said one of said plurality of regulated input voltages being computed by said controller in order to maintain said one of said plurality of regulated input voltages in accordance with said voltage-current loadline of said one of said plurality of regulated input voltages for different values of said load current.

7. The regulator of claim 6, wherein said controller is further configured to determine said gain factor in order to produce said one of said plurality of regulated input voltages according to said voltage-current loadline, wherein said voltage-current loadline specifies a linear relationship for said one of said plurality of regulated input voltage required values.

8. The regulator of claim 6, wherein said controller is further configured to adjust said gain factor as required to produce said one of said plurality of regulated input voltages according to said voltage-current loadline, and wherein said voltage-current loadline specifies a total power voltage-current relationship.

9. The regulator of claim 6, wherein said controller is further configured to adjust said gain factor as required to produce said one of said plurality of regulated input voltages according to said voltage-current loadline, and wherein said voltage-current loadline specifies a non-linear relationship for said one of said plurality of input voltage required values.

10. The regulator of claim 9, wherein said non-linear loadline further includes a discontinuity corresponding to an intermediate current value between zero and maximum, associated with said microelectronics device.

11. An electronic system, comprising:
a microelectronics device having at least two input voltage required values to receive at least two input supply voltages;
a regulator coupled to said microelectronics device; and
a power source coupled to said regulator,
wherein said regulator is configured to produce said at least two supply voltages within an input voltage range bounded by an upper limit and a lower limit,
said upper limit of each of said at least two input supply voltages is a first reliability voltage value, said first reliability voltage value is determined by multiplying one plus a tolerance level by a first input voltage required value, and
said lower limit of at least one of said at least two input supply voltages is determined by one minus a tolerance level multiplied by each of said at least two input supply voltage required values.

12. The electronic system of claim 11, wherein said controller is further configured to adjust said gain factor to produce at least one of said at least two input supply voltages in accordance with said voltage-current loadline, wherein said voltage-current loadline specifies a linear relationship for said regulated input voltage required values.

13. The electronic system of claim 11, wherein said controller is further configured to adjust said gain factor to produce at least one of said at least two input supply voltages in accordance with said voltage-current loadline, wherein said loadline specifies a total power voltage-current relationship.

14. The electronic system of claim 11, wherein said controller is further configured to adjust said gain factor to produce at least one of said at least two input supply voltages in accordance with said voltage current loadline, wherein said loadline specifies a non-linear relationship for said plurality of input voltage required values.

15. The electronic system of claim 14, wherein said non-linear loadline further includes a discontinuity corresponding to an intermediate current value between zero and maximum, associated with said microelectronics device.

16. A regulating method, comprising:
supplying multiple input voltages to one or more microelectronics devices, each of said multiple input voltages including a corresponding input voltage required value;
determining an upper limit of the voltage regulation range for all of said multiple input voltages by multiplying a first corresponding input voltage required value by a sum of one plus a tolerance level;
determining a lower limit of a voltage regulation range for said multiple input voltages by a gain factor in accordance with a corresponding voltage-current loadline; and
maintaining each of said multiple input voltages supplied to said microelectronics devices above said lower limit of said voltage regulation range and under said first reliability voltage.

17. The regulating method of claim 16, wherein said voltage-current loadline specifies a linear relationship for said regulated input voltage required values.

18. The regulating method of claim 16, wherein said voltage-current loadline specifies a total power voltage-current relationship.

19. The regulating method of claim 16, wherein said voltage-current loadline specifies a non-linear relationship for said plurality of input voltage required values.

20. The regulating method of claim 19, wherein said non-linear relationship further includes a discontinuity corresponding to an intermediate current value between zero and maximum, associated with said microelectronics device.

* * * * *